United States Patent
Ahn et al.

(10) Patent No.: US 10,733,082 B2
(45) Date of Patent: Aug. 4, 2020

(54) COMPUTER PROGRAM AND SERVER FOR EXECUTING TEST GROUP DISTRIBUTION METHOD

(71) Applicant: HYPERCONNECT, INC., Seoul (KR)

(72) Inventors: Sang Il Ahn, Chungcheongbuk-do (KR); Sang Pil Yoon, Gyeonggi-do (KR)

(73) Assignee: HYPERCONNECT, INC., Seoul (KR)

( * ) Notice: Subject to any disclaimer, the term of this patent is extended or adjusted under 35 U.S.C. 154(b) by 0 days.

(21) Appl. No.: 16/364,709

(22) Filed: Mar. 26, 2019

(65) Prior Publication Data
US 2019/0294532 A1    Sep. 26, 2019

(30) Foreign Application Priority Data
Mar. 26, 2018   (KR) .......................... 10-2018-0034753

(51) Int. Cl.
*G06F 11/36*         (2006.01)
*H04L 29/08*         (2006.01)

(52) U.S. Cl.
CPC ...... *G06F 11/3684* (2013.01); *G06F 11/3664* (2013.01); *H04L 67/306* (2013.01)

(58) Field of Classification Search
CPC .. G06F 3/048; G06F 11/3664; G06F 11/3684; H04L 41/0893; H04L 43/50; H04L 67/306
USPC ....................................................... 717/130
See application file for complete search history.

(56) References Cited

U.S. PATENT DOCUMENTS

| | | | | |
|---|---|---|---|---|
| 6,601,020 B1* | 7/2003 | Myers | ................. | G06F 11/3414 455/67.14 |
| 6,839,680 B1* | 1/2005 | Liu | .................... | G06Q 30/0204 705/7.33 |
| 8,634,821 B2* | 1/2014 | Raleigh | ................. | H04M 15/61 455/419 |
| 9,565,543 B2* | 2/2017 | Raleigh | ................. | H04M 15/00 |
| 2015/0378828 A1* | 12/2015 | Moncelle | ............... | G06F 16/21 707/640 |

FOREIGN PATENT DOCUMENTS

KR        2017-0014560 A      2/2017

* cited by examiner

*Primary Examiner* — Ryan D. Coyer
(74) *Attorney, Agent, or Firm* — Marshall, Gerstein & Borun LLP

(57) ABSTRACT

A computer program is stored in a computer-readable recording medium to implement a test group distribution method in a server device. The test group distribution method includes: generating identification information of a first test to be performed, differently from identification information of at least one test that is registered in advance, wherein the first test is performed by a plurality of user terminals classified into a plurality of groups; generating a unique identifier of each of users by using a first key comprising identification information of each user and a second key comprising the identification information of the first test; and determining test group information of each user based on the unique identifier of each user, the test group information corresponding to a group to which each user belongs.

12 Claims, 5 Drawing Sheets

K1 = "kpteh008912", K2 = "rbnc00456"

UI1 = "kpteh008912rbnc00456"

UI2 = "kpteh008912 rbnc00456aaa"

K11 = kpteh, K12 = 008912, K21 = rbnc, K22 = 00456
UI3 = "kpteh00456008912rbnc"

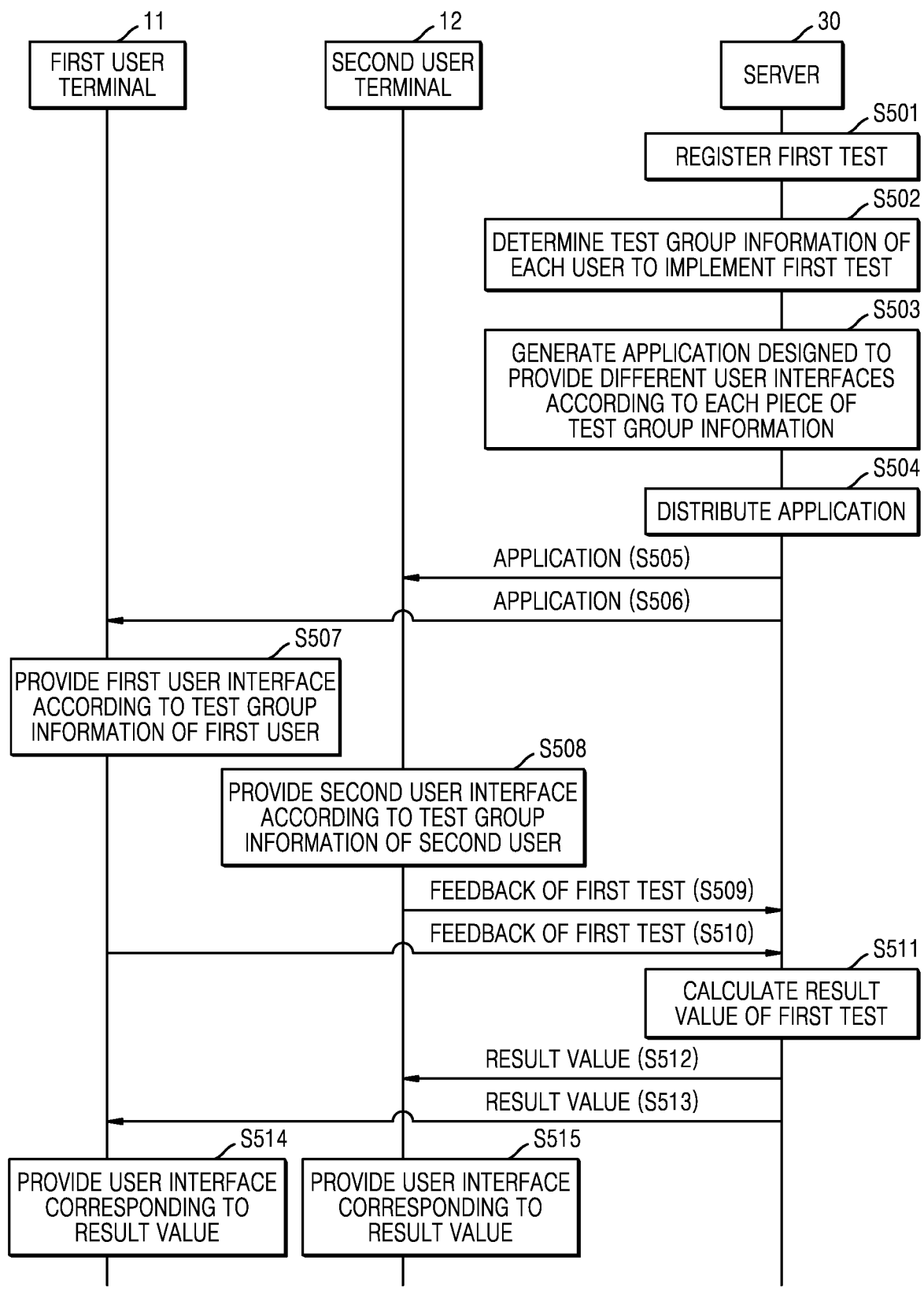

COMPUTER PROGRAM AND SERVER FOR EXECUTING TEST GROUP DISTRIBUTION METHOD

CROSS-REFERENCE TO RELATED APPLICATION

This application claims the benefit of Korean Patent Application No. 10-2018-0034753, filed on Mar. 26, 2018, in the Korean Intellectual Property Office, the disclosure of which is incorporated herein in its entirety by reference.

BACKGROUND

1. Field

One or more embodiments relate to a test group distribution method that determines a user group of each test based on identification information of tests that are stored in advance and identification information of users, and a test group distribution server.

2. Description of the Related Art

To receive services in which they are interested, users who use mobile communication terminals may install and use various types of applications. Service providers that develop and distribute mobile applications periodically or non-periodically send notifications to users who install and use the applications, and such notifications are called pushes.

Instead of users consuming information voluntarily by searching for the information, pushes send information to the users, and thus, according to the intentions of the service providers, the users receive the information without their requests. That is, a party transmitting the information (e.g., a service provider) may directly control the flow of information through push technology.

Transmission of pushes by the service providers leads the users to use the services provided by the service providers, and information included in the pushes and transmitted generally includes brief information regarding services provided by the service providers.

Users who select push messages may identify detailed information regarding products or services corresponding to the pushes, and the information is provided through web sites or applications operated by the service providers transmitting the pushes.

The service providers transmitting the pushes aim at prompting the users receiving the pushes to select and check the detailed information, and thus it is desirable to transmit pushes containing content that the users prefer.

(Patent document 0001) KR 2017-0014560.

SUMMARY

One or more embodiments are designed to solve the above problems and/or limitations and aim at reducing storage space, in which test group information distributed to the users according to tests is stored, when user groups are distributed to implement tests.

One or more embodiments aim at producing test group information of each user based on identification information of tests and user information, which is previously stored, without separate memory storage for newly-added tests.

Additional aspects will be set forth in part in the description which follows and, in part, will be apparent from the description, or may be learned by practice of the presented embodiments.

According to one or more embodiments, a computer program is stored in a computer-readable recording medium to implement a test group distribution method in a server device, the test group distribution method including: generating identification information of a first test, which is to be implemented, differently from identification information of at least one test that is registered in advance, wherein the first test is implemented by a plurality of user terminals classified into a plurality of groups; generating a unique identifier of each of users by using a first key comprising identification information of each user and a second key comprising the identification information of the first test; and determining test group information of each user that corresponds to a group to which each user belongs, based on the unique identifier of each user.

The determining of the test group information of each user may include determining the test group information of each user by converting the unique identifier at least once by using a random function and distributing a conversion value to one of a plurality of groups of included in the first test.

The determining of the test group information of each user may include determining the test group information of each user by distributing a unique identifier, which is converted by adding a string to an arbitrary location of the unique identifier, to one of a plurality of groups included in the first test.

The determining of the test group information of each user may include determining the test group information of each user based on a remainder that is calculated by dividing the unique identifier by a total number of groups included in the first test.

When it is determined that a first group and a second group of the first test has a distribution ratio of one to two, the method may further include setting a number of groups of the first test to be equal to 3 that is a sum of a distribution ratio of each group by considering the distribution ratio; and distributing at least one user, of which test group information of the user has a first value, to the first group and at least one user, of which test group information of the user has a second value or a third value, to the second group.

The method may further include generating an application providing different user interfaces according to the test group information of each user and distributing the application to a terminal of each user.

According to one or more embodiments, a server includes: a processor; and a memory storing instructions executable by the processor. The processor executes the instructions to: generate identification information of a first test, which is to be implemented, differently from identification information of at least one test that is registered in advance, wherein the first test is implemented by a plurality of user terminals classified into a plurality of groups; generate a unique identifier of each of users by using a first key comprising identification information of each user and a second key comprising the identification information of the first test; and determine test group information of each user that corresponds to a group performed by each user, based on the unique identifier of each user.

The processor may execute the instructions to determine the test group information of each user by converting the unique identifier at least once by using a random function and distributing a conversion value to one of a plurality of groups included in the first test.

The processor may execute the instructions to determine the test group information of each user by distributing a unique identifier, which is converted by adding a string to an arbitrary location of the unique identifier, to one of a plurality of groups included in the first test.

The processor may execute the instructions to determine the test group information of each user based on a remainder that is calculated by dividing the unique identifier by a total number of groups included in the first test.

When it is determined that a first group and a second group of the first test has a distribution ratio of one to two, the processor may set a number of groups of the first test to be equal to 3 that is a sum of a distribution ratio of each group by considering the distribution ratio, and may distribute at least one user, of which test group information of the user has a first value, to the first group and at least one user, of which test group information of the user has a second value or a third value, to the second group.

The processor may generate an application providing different user interfaces according to the test group information of each user and may distribute the application to a terminal of each user.

A computer program according to one or more embodiments may be stored in a medium to implement any one of test group distribution methods according to an embodiment by using a computer.

There is further provided a computer-readable recording medium having recorded thereon a computer program for performing other methods and operating other systems to realize the disclosure and for implementing the above method.

BRIEF DESCRIPTION OF THE DRAWINGS

These and/or other aspects will become apparent and more readily appreciated from the following description of the embodiments, taken in conjunction with the accompanying drawings in which:

FIG. 7 is a flowchart for explaining reception/transmission of data between user terminals and a server.

DETAILED DESCRIPTION

Figure 1:
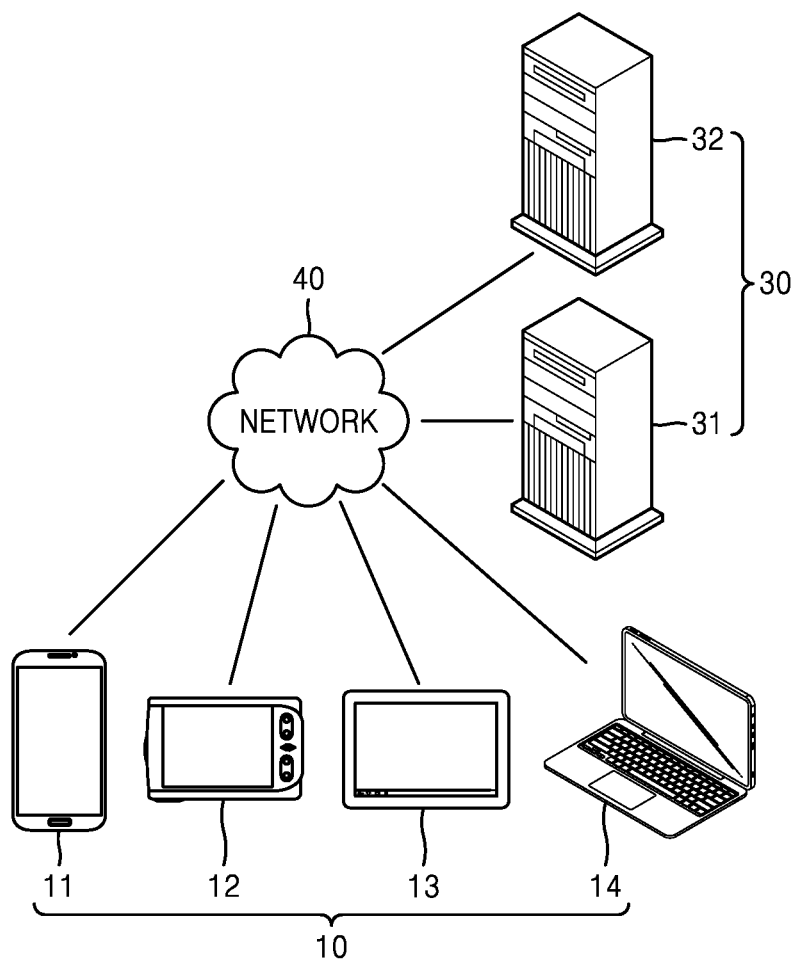
FIG. 1 is a diagram of an example of a network environment according to an embodiment of the disclosure.

As the disclosure allows for various changes and numerous embodiments, particular embodiments will be illustrated in the drawings and described in detail in the written description. The attached drawings for illustrating embodiments of the disclosure are referred to in order to gain a sufficient understanding of the disclosure, the merits thereof, and the objectives accomplished by the implementation of the disclosure. The disclosure may, however, be embodied in many different forms and should not be construed as being limited to the embodiments set forth herein. As used herein, the term "and/or" includes any and all combinations of one or more of the associated listed items. Expressions such as "at least one of," when preceding a list of elements, modify the entire list of elements and do not modify the individual elements of the list.

In the present specification, a test is implemented on a web page provided to user terminals, and when an input from each user is received, the test may be terminated. Tests may be associated with, for example, layouts of graphic interfaces and user interfaces provided on video chatting screens. The graphic interfaces and the user interfaces provided to the users may vary in location, size, etc. Optimum locations, optimum sizes, etc. of the graphic interfaces and the user interfaces may be selected by collecting whether the graphic interfaces and user interfaces are executed, a reaction speed, and the like from the users. The tests may include options and may be performed by grouping all of the users according to each option.

While tests are implemented, a test group distribution device according to one or more embodiments of the disclosure may generate group information in each test of each user based on identification information of each user and/or identification information of a test without storage space in which the group information in the test of the user is stored. The test group distribution device according to one or more embodiments of the disclosure may calculate the group information in each test of each user by utilizing the identification information of a test and user information that is stored in advance, without separate memory space for newly-added tests. According to one or more embodiments of the disclosure, additional memory in which the identification information of the tests is stored may be required. According to one or more embodiments of the disclosure, by converting a unique identifier corresponding to each user by using an algorithm having compressibility, memory required to process the unique identifier may be reduced, and calculation regarding the unique identifier may be simplified. By converting the unique identifier corresponding to each user by using an algorithm used to evenly distribute the unique identifiers, characteristics of all of the users may be reflected to result values that are combined by implementing the tests.

FIG. 1 is a diagram of an example of a network environment according to an embodiment of the disclosure. The network environment of FIG. 1 is an example including terminals, servers 31 and 32 (hereafter, denoted as 30), and a network 40. The number of electronic devices and servers is not limited to the embodiment of FIG. 1.

The terminals 10 may be fixed terminals or mobile terminals realized as computer devices. Examples of the terminals 10 may i smart phones, mobile phones, a navigation device, computers, laptops, digital broadcast terminals, personal digital assistants (PDAs), portable multimedia players (PMPs), tablet PCs, and the like. For example, a first user terminal 11 may communicate with other user terminals 12, 13 and 14 and/or the servers 31 and 32 via the network 40 in a wired or wireless communication manner.

Communication methods are not limited and may include a communication method utilizing a communication network that may be included in the network 40 (e.g., a mobile communication network, wired Internet, wireless Internet, and a broadcast network), and near-field wireless communication between devices. For example, the network 40 may include at least one arbitrary network among a personal area network (PAN), a local area network (LAN), a campus area network (CAN), a metropolitan area network (MAN), a wide area network (WAN), a broadband network (BBN), Internet, and the like. Also, the network 40 may arbitrarily include at least one of network topologies including a bus network, a star network, a ring network, a mesh network, a star-bus network, and a tree or hierarchical network. However, the network 40 is not limited thereto.

Each server 30 may be realized as a computer device or computer devices providing commands, codes, files, content, services, and the like by communicating with the user terminals 10 via the network 40. For example, the first user terminal 11 may access the server 30 through an application installed on the first user terminal 11 and may receive preset services (e.g., a video call service, an social network service (SNS), a game service, a financial service, etc.). For example, the server 30 may set a communication session for a video call service and may route reception/transmission of messages between the user terminals 10 through the set communication session.

Figure 2:
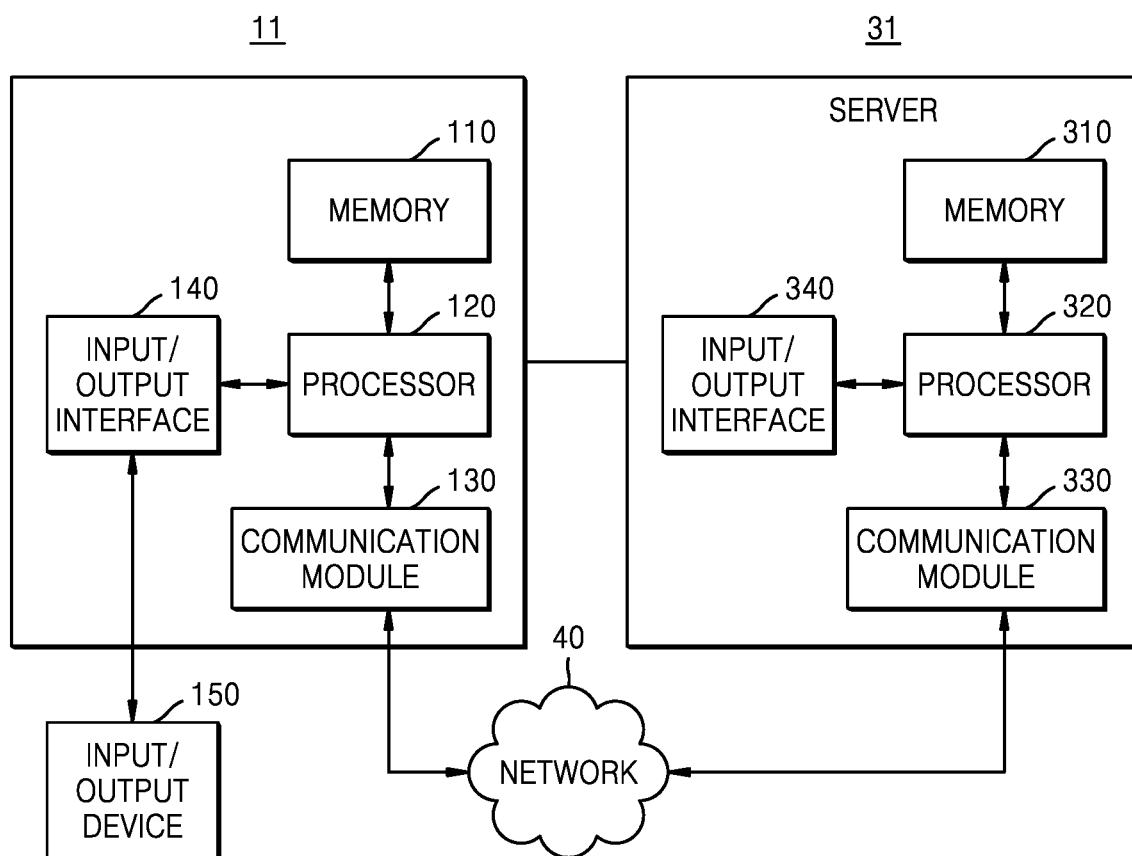
FIG. 2 is a block diagram of internal structures of a user terminal and a server, according to an embodiment of the disclosure.

FIG. 2 is a block diagram of internal structures of a user terminal and a server, according to an embodiment of the disclosure. FIG. 2 shows the internal structure of the first user terminal 11 as an example of a user terminal and the internal structure of the server 31 as an example of a server. The electronic devices 12, 13, and 14 or the server 32 may have the same or similar internal structures.

The first user terminal 11 and the server 30 may include memories 110 and 310, processors 120 and 320, communication modules 130 and 330, and input/output interfaces 140 and 340. The memories 110 and 310 are computer-readable recording media and may include permanent mass storage devices such as random access memory (RAM), read only memory (ROM), and disk drive. Also, in the memories 110 and 310, an operating system and at least one program code (e.g., a browser installed and operating on the first user terminal 11, or codes for applications, etc. for providing certain services) may be stored. Software components may be loaded by using a drive mechanism from the computer-readable recording media that are separate from the memories 110 and 310. The computer-readable recording media may include floppy drives, disks, tapes, DVD/CD-ROM drives, memory cards, etc. In another embodiment, the software components may be loaded to the memories 110 and 310 through the communication modules 130 and 330 instead of the computer-readable recording media. For example, at least one program may be loaded to the memories 110 and 310 based on a program (e.g., the above application) installed by files that developers or a file distribution system (e.g., the server 30), which distributes installation files of the application, provides through the network 40.

The processors 120 and 320 may perform basic calculation, logic and input/output calculation and thus may process commands of computer programs. The commands may be provided to the processors 120 and 320 by the memories 110 and 310 or the communication modules 130 and 330. For example, the processors 120 and 320 may execute the commands that are received according to program codes stored in recording media such as the memories 110 and 310.

The communication modules 130 and 330 may provide functions for helping communication between the first user terminal 11 and the server 31 through the network 40 and may provide functions for helping communication between another electronic device (e.g., the second user terminal 12) or another server (e.g., the server 32). For example, a request (e.g., a request for a video call service) that the processor 120 of the first user terminal 11 generates according to the program codes stored in the recording media such as the memory 110 may be transmitted to the server 31 through the network 40 according to the control of the communication module 130. On the contrary, control signals, commands, content, files, or the like of the server 31 that are provided according to the control of the processor 120 may be transmitted to the first user terminal 11 through the communication module 130 of the first user terminal 11 via the communication module 130 and the network 40. For example, the control signals, the commands, or the like of the server 31 that are received through the communication module 130 may be transmitted to the processor 120 or the memory 110, and the content, the files, or the like may be stored in a storage medium that the first user terminal 11 may further include.

The input/output interfaces 140 and 340 may be means for interfacing with the input/output interface 150. For example, an input device may include a device such as a keyboard or a mouse, and an output device may include a device such as a display for displaying a communication session of the application. As another example, the input/output interface 140 may be a device for interfacing with a device, for example, a touch screen, in which functions for inputs and outputs are integrated. As a detailed example, when the processor 120 of the first user terminal 11 processes commands of the computer program loaded to the memory 110, a service screen or content, which is produced based on data provided by the server 31 or the second user terminal 12, may be displayed through the input/output interface 140.

Also, in other embodiments, the first user terminal 11 and the server 31 may include more components than the components shown in FIG. 2. However, there is no need to clearly illustrate most of components according to the related art. For example, the first user terminal 11 may be realized to include at least part of the input/output interface 150 or may further include components such as a transceiver, a global positioning system (GPS) module, a camera, sensors, and a database. As a specified example, when the first user terminal 11 is a smart phone, the first user terminal 11 may further include an acceleration sensor or a gyroscope sensor, a camera, various physical buttons, buttons using a touch panel, input/output ports, a vibrator for vibrations, and the like, all of which are generally included in the smart phone.

According to one or more embodiments of the disclosure, the test group distribution device may be included in a server or a user terminal and may implement tests for obtaining respective pieces of feedback regarding various combinations of locations, arrangements, etc. of graphic user interfaces of the video call service. A degree of relative reaction of each graphic user interface, which is provided by implementing the test, may be calculated based on the number of times that the tests are implemented by the user, a ratio of the tests, and the like. For example, after a first group providing a first user interface to a first location and a second group providing the first user interface to a second location are set and users are respectively distributed to the first group and the second group through the implementation of the tests, feedback including, for example, the number of times that the first user interface is executed, and intervals of execution may be received from users corresponding to the first group, and then feedback including, for example, the number of times that the second user interface is executed, and intervals of execution may be received from users corresponding to the second group. By comparing the feedback from the users of the first group with the feedback from the users of the second group, a group having a greater number of execution times and shorter intervals of execution may be determined, and a location tested by using the determined group may be determined as a location of the first user interface.

Figures 3, 4:
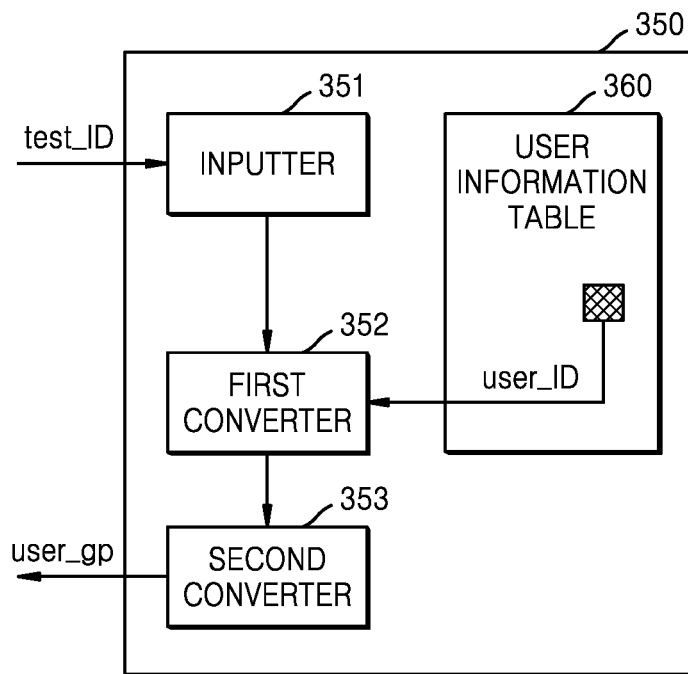
FIG. 3 is a block diagram of a structure of a test group distribution device according to embodiments of the disclosure.
FIG. 4 show examples of generated unique identifiers.

FIG. 3 is a block diagram of a structure of a test group distribution device 350 according to a first embodiment.

Referring to FIG. 3, the test group distribution device 350 may include an inputter 351, a first converter 352, a second converter 353, and a user information table 360.

The test group distribution device 350 may generate a unique identifier of each user based on identification information of an input test and identification information of the users that is stored in advance and may output group information (hereinafter, referred to as test group information) in the test based on the unique identifier. The test group distribution device 350 may distribute the identification information of the user to any one of the groups included in the test. The unique identifiers of the users, which are generated based on pieces of the identification information of the users that are different from each other, may be different from each other. The identification information of the users and/or the identification information of the tests may include at least one of numbers, characters, special characters, signs, and the like and may be converted into forms of bits that are smallest units of data that are processed by a computer. The identification information may be converted into forms of process data of a processing device. The computing device may identify and process the identification information of the users and/or the identification information of the tests in forms of bits, but the components included in the test group distribution device 350 may express the identification information as strings including numbers, characters, special characters, signs, and the like. The identification information of the tests may be generated to identify the tests and may be different from a test that is currently conducted. The identification information of the users may be generated to identify the users, and the pieces of the identification information may be different according to the users. The inputter 351 may receive and analyze a test registration request and may extract identification information test_ID of the test. The inputter 351 may output a first key including the identification information of the test. The test registration request may be received via various communication networks such as an Internet network and a near field network. The test registration request may include test-related information such as a test title, test descriptions, test items, and the identification information of the tests and may be decoded by using determined protocols.

The first converter 352 may read identification information user_ID of each user from a user information table 360, and may generate a unique identifier including a first key and a second key that are received through the inputter 351, the second key being the identification information of each user. The user information table 360 may include detailed information such as identification information, sex, age, and residence of each user. The user information table 360 may be non-volatile memory from which input information is not deleted even though power is not supplied, or may be volatile memory compressed data stored in a system area is stored when a computer is booted.

The first converter 352 may access a specific area or a specific section of the user information table 360 and may read the identification information of each user. The first converter 352 may generate, as a unique identifier, a string including at least one element of the first key and at least one element of the second key in a fixed order. Here, the element is part of the first key or the second key and may be a string in which numbers, characters, special characters, signs, and the like are one-dimensionally arranged. For example, the element may be the smallest unit (byte) in character expression of a computer processor. The first key may be obtained by converting the first key at least once. Also, the second key may be obtained by converting the second key at least once. A conversion method may utilize a function that is unidirectional and has compressibility and efficiency. For example, conversion methods of the identification information may utilize hash functions or random functions such as MD5, SHA-1, RIPEMD, HAS-160, and SH256.

The unique identifiers may be generated in various manners as shown in FIG. 4. Due to the test group distribution device, a first key K1 including identification information of a test is "kpteh008912", and a second key K2 including identification information of a user is "rbnc00456". A unique identifier UI1 may be generated in a manner that the identification information of the test and the identification information of the user are consecutively included and may be "kpteh008912rbnc00456".

A unique identifier UI2 may further include an arbitrary string ("aaa") other than the identification information of the test and the identification information of the user. The arbitrary string may be located at the first or last unique identifier. However, the location is not limited thereto. The arbitrary string may be between two arbitrary elements from among elements included in the unique identifier.

Also, a unique identifier UI3 may divide the first key K1 and the second key K2 into elements and may randomly arrange the elements. The first key K1 may be divided into keys K11 and K12, and the second key K2 may be divided into keys K21 and K22. The unique identifier UI3 may be combined and generated in a stated order of keys K11, K22, K12, and K21. In other words, the elements of the first key K1 and the elements of the second key K2 may be alternately arranged to complete a unique identifier.

For example, when a first key is 'mother' and a second key is 'sea', a unique identifier may be a string including at least once elements included in a union {m, o, t, h, e, r, s, e, a} of a subset {m, o, t, h, e, r} of elements of the first key and a subset {s, e, a} of elements of the second key. Locations of respective elements ('mothersea', 'seamother', 'mseaother', etc.) may be various combinations. The second converter 353 generates group information user_gp of a group to which each user belongs from among groups included in a test, based on the unique identifier received from the first converter 352. The second converter 353 may convert the unique identifier at least once into a conversion key and may generate group information of each user based on the conversion key. In this case, a conversion method of the unique identifier may be a function that is unidirectional and has compressibility and efficiency. For example, conversion methods of the unique identifier may use hash functions and random functions such as MD5, SHA-1, RIPEMD, HAS-160, and SH256. The test group distribution device according to embodiments of the disclosure may evenly distribute unique identifiers corresponding to the users and make the number of users of groups included in tests be uniform. In addition, due to the compressibility of a process of converting the unique identifiers, the unique identifiers corresponding to the users may have data types expressed in smaller bits. Through a process of converting the unique identifiers into data types expressed in smaller bits, resources required to produce group information corresponding to the users may be saved.

The second converter 353 may distribute the unique identifiers or conversion keys corresponding to the users by using algorithms that are designated for the groups of each test. The second converter 353 may divide the unique identifiers or conversion keys corresponding to the users by the number of groups of each test and may generate group information corresponding to a calculated remainder as group information of each user. The second converter 353 converts the unique identifiers or conversion keys corresponding to the users into group information of groups related to the tests. As a result, the second converter 353 may return the group information of a corresponding test of each user.

When the first group and a second group of a test need to have not an identical ratio but a ratio of one to two, the second converter 353 may set the number of groups of tests to be 3 instead of 2 by considering the ratio of one to two and distribute at least one user, of which the group information regarding each test has a first value, to the first group and at least one user, of which the group information regarding each test has a second or third value, to the second group. Thus, the test group distribution device may differently set the number of users included in each group of the test by adjusting a ratio of each group.

Figure 5:
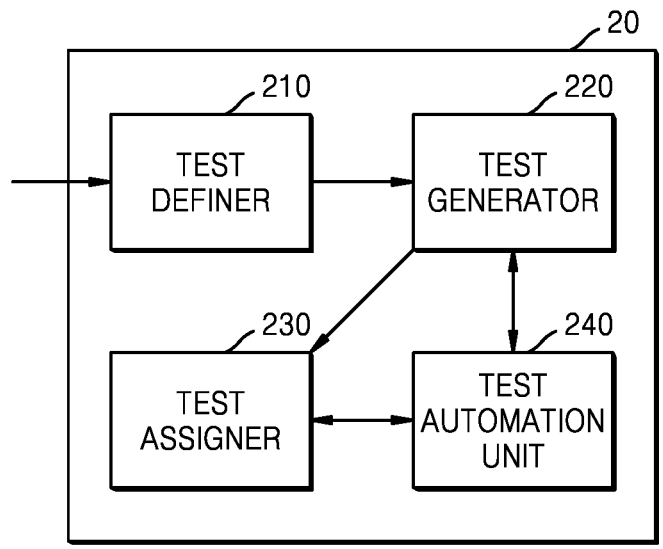
FIG. 5 is a block diagram of a structure of a test automation system that implements a certain test by using a test group distribution device.

FIG. 5 is a block diagram of a structure of a test automation system 20 that implements a certain test by using a test group distribution device.

As shown in FIG. 5, the test automation system 20 may include a test definer 210, a test generator 20, a test assigner 230, and a test automation unit 240. The test assigner 230 may include the test group distribution device of FIG. 3 or 4.

The test automation system 20 may register information regarding the tests according to certain test implementation commands and may ensure a terminal automatically implements registered tests. For example, the test automation system 20 may be realized as a call back function, etc. that are called according to user inputs and may automatically transmit signals to a server according to the user inputs. User inputs may be collected for respective groups corresponding to options included in the registered tests. The test automation system 20 receives the test implementation commands through the test definer 210 and registers first tests corresponding to the test implementation commands. In this case, the test definer 210 generates identification information of the first tests to make the first tests be distinguished from at least one registered test and registers the number of groups included in the first tests.

The test generator 220 plans and generates the first tests based on data obtained through the test definer 210. In this case, the test generator 220 may generate test pages regarding respective groups included in the first tests. The test generator 220 may variously express items, factors, etc. that are related to the first tests included in the test implementation commands and may generate a test page of each group to be different from test pages of other groups. For example, test pages of groups included in tests may include locations, sizes, colors, shapes, etc. of a graphic interface and a user interface.

The test assigner 230 may generate a unique identifier by using a first key including identification information of users and a second key including identification information of tests received through the test generator 220 and may generate group information of each test of the user by using the unique identifier. The first key may include a value obtained by converting the identification information of the tests at least once. The second key may include a value obtained by converting the identification information of the users at least once. The unique identifier may also be converted at least once.

Figure 6:
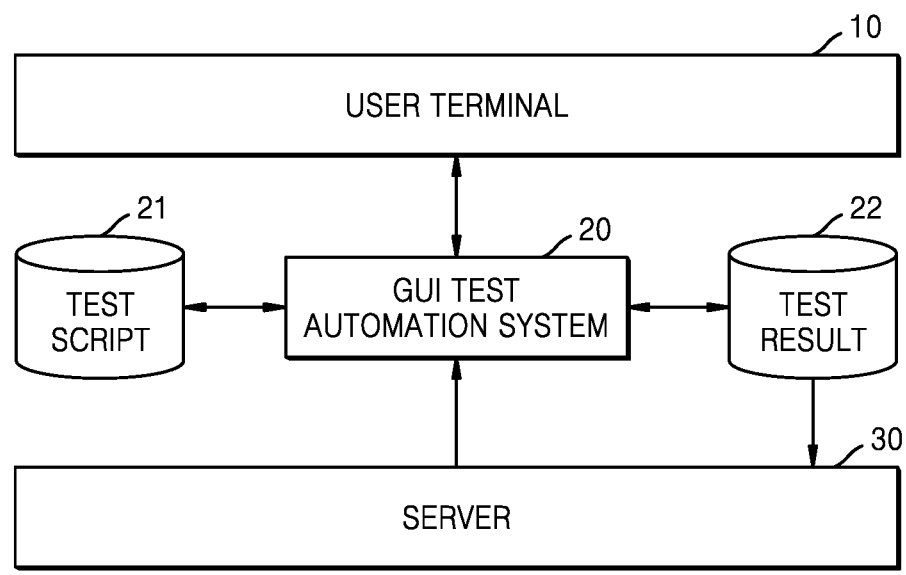
FIG. 6 is a diagram of a network environment related to automatic test implementation by using a test group distribution device.

The test automation unit 240 may selectively transmit, to the users, the test pages regarding the groups included in the tests generated through the test generator 220. The test page transmitted to each user terminal may be determined according to the group information of the test of each user. In this case, the test pages corresponding to the groups included in the test may be stored in advance in each user terminal, and a first page among the test pages according to the test group information of each user, which is calculated according to the identification information of each user, may be provided on a screen. The test automation system 20 that performs the tests by using the test group distribution device may not separately store the group information of each test with regard to the users and may produce the group information of the user based on the identification information of each user and the identification information of each test. The test automation system 20 may divide the users into the groups included in the tests, based on the produced group information of the user. The test automation system 20 may generate and transmit test pages respectively corresponding to the tests that are registered in a terminal of a first user. The test automation system 20 may determine a group of a terminal of each user as one of the groups included in the test without generating group information regarding all of the users. FIG. 6 is a diagram of a network environment related to automatic test implementation by using the test group distribution device.

As shown in FIG. 6, the network environment may include the user terminal 10, a test script 21, the test automation system 20, a test result database 22, and the server 30.

The communication between the user terminal 10 and the server 30 is described with reference to FIGS. 1 and 2.

The test automation system 20 may receive a test implementation command from the server 30 and may process the same. The test automation system 20 may divide the users into groups and may implement tests that have to be implemented. As information of users of a group included in each test is not separately stored and managed by using the test group distribution device according to an embodiment of the disclosure, resources a system may be saved. Test group information of the first user may be independently determined by using a unique identifier regarding a corresponding test of the first user that is independent from test group information of other users and/or test group information of the first user in another test.

The test automation system 20 may statistically manage feedback data regarding the groups included in the test. When feedback data regarding each test is received, the test automation system 20 may classify the feedback data according to group information of each test that corresponds to the feedback data and may transmit the feedback data to the test result database 22. The feedback data regarding each test may be stored in a region of an application installed in the user terminal 10 with regard to the test. The server 30 may receive the feedback data from the user terminals 10 and may obtain result values corresponding to the tests. The server 30 may change layouts of interfaces, for example, locations, shapes, sizes, and the like, which are provided to the users based on the feedback data and the result values regarding the implemented tests. The test pages corresponding to the options of the test may be generated as packages in advance, installed on the user terminals 10, and automatically changed according to the result values after the completion of the tests. A process of installing an application, to which result values are additionally reflected after the completion of the tests, may not be required. When each user logs in, the user interfaces provided to each user may be determined based on the group information of the user, which is produced based on the identification information of the user, and then provided.

FIG. 7 is a flowchart for explaining reception/transmission of data between the user terminals and the server.

In operation S501, the server 30 may register a first test according to an external request or an input from an administrator. In operation S502, the server 30 may determine group information of each user to implement the first test. In operations S503 and S504, the server 30 may generate an application to provide user interfaces that are different according to each piece of the test group information and may distribute the application respectively to the first and second user terminals 11 and 12.

In operation S507, the first user terminal 11 may provide a first user interface according to test group information that is determined by using a unique identifier that is generated by considering identification information of the first user and identification information of the first test.

In operation S508, the second user terminal 12 may provide a second user interface according to test group information that is determined by using a unique identifier that is generated by considering identification information of the second user and identification information of the first test.

In operation S510, the first user terminal 11 may generate feedback including an inquiry regarding whether to execute the provided first user interface, an implementation frequency, and the like, and may transmit the feedback to the server 30. In operation S509, the second user terminal 12 may generate feedback including an inquiry regarding whether to execute the provided second user interface, an implementation frequency, and the like and may transmit the feedback to the server 30.

In operation S511, the server 30 may calculate a result value of the first test that is obtained by combining the feedback received from the first and second user terminals 11 and 12.

In operations S512 and S513, the server 30 may transmit the result value to the first and second user terminals 11 and 12, respectively.

In operation S514, the first and second user terminals 11 and 12 may respectively provide an identical user interface corresponding to the received result value.

According to the one or more embodiments of the disclosure, groups included in a test may be evenly distributed by distributing test group information of each user by using a unique identifier of each user that is converted by using an algorithm for even distribution, and to feedback of each group, all characteristics of the users with regard to the tests may be reflected.

According to the one or more embodiments of the disclosure, when user groups are distributed to implement tests, storage space, in which test group information distributed to the users according to tests is stored, may be reduced.

Also, according to the one or more embodiments of the disclosure, test group information of each user may be produced based on identification information of tests and user information, which is previously stored, without separate memory storage for newly-added tests.

The device described above may be realized as hardware components, software components, and/or a combination thereof. For example, the device and the components according to the one or more embodiments of the disclosure may be realized by using at least one general-use computer or special-purpose computer like, for example, a processor, a controller, an arithmetic logic unit (ALU), a digital signal processor, a microcomputer, a field programmable gate array (FPGA), a programmable logic unit (PLU), a microprocessor, or other devices capable of executing and responding to instructions. A processor may execute an operating system (OS) and at least one software application executed on the OS. In addition, the processor may access, store, manipulate, process, and generate data in response to the execution of the software application. For convenience of understanding, it may be described that one processor is used, but one of ordinary skill in the art may understand that the processor may include multiple processing elements and/or various types of processing elements. For example, the processor may include processors or may include one processor and one controller. Also, the processor may have other processing configuration like a parallel processor.

Software may include a computer program, codes, instructions, or at least one combination thereof and may instruct a processor in a desired manner or may independently or collectively instruct the processor. Software and/or data may be permanently or temporarily embodied in a certain type of a machine, components, physical equipment, virtual equipment, a computer storage medium or device or signal waves to be interpreted by a processor or to provide instructions or data to the processor. Software may be distributed on a computer system connected via a network and may be stored or executed in a distributed manner. Software and data may be stored in at least one computer-readable recording medium.

The method according to one or more embodiments of the disclosure may be realized as program instructions executed by various computer media and may be recorded in a computer-readable recording medium. The computer-readable recording medium may include program instructions, data files, data structures, or any combination thereof. The program instructions recorded in the computer-readable recording medium may be specifically designed for one or more embodiments of the disclosure or may be used as it is known to one of ordinary skill in the art. Examples of the computer-readable recording medium include magnetic storage media (e.g., hard disks, floppy disks, magnetic tapes, etc.), optical media (e.g., CD-ROMs, or DVDs), magneto-optical media (e.g., floptical disks, etc.) and hardware devices (e.g., ROM, RAM, flash memory, etc.) which are specifically designed to store and execute the program instructions. Examples of the program instructions include machine-language codes produced by compliers, and high-level language codes executable by a computer by using an interpreter, etc. The hardware devices may function as at least one software module to implement operations according to one or more embodiments of the disclosure, and vice versa.

It should be understood that embodiments described herein should be considered in a descriptive sense only and not for purposes of limitation. Descriptions of features or aspects within each embodiment should typically be considered as available for other similar features or aspects in other embodiments. For example, described techniques may be performed in an order different from the described order, and/or the described components such as a system, a structure, a device, and a circuit may be combined in forms different from the described forms, or all equivalents and substitutes that do not depart from the spirit and technical scope of the disclosure are encompassed in the disclosure.

While one or more embodiments have been described with reference to the figures, it will be understood by those of ordinary skill in the art that various changes in form and details may be made therein without departing from the spirit and scope of the disclosure as defined by the following claims.

What is claimed is:

1. A non-transitory computer-readable recording medium storing instructions for implementing a test group distribution method that, when executed by one or more processors in a server device, cause the one or more processors to:
generate identification information of a first test to be performed, wherein the identification information of the first test is different from identification information of at least one test that is registered in advance, wherein the first test is performed by a plurality of user terminals, wherein each of the user terminals is associated with a respective user of a plurality of users, and wherein each of the plurality of users is classified into a group of a plurality of groups;
generate a unique identifier of each of the plurality of users by using a first key for each of the plurality of users, the first key for each user comprising identification information of the user, and a second key comprising the identification information of the first test; and
determine test group information of each of the plurality of users based on the unique identifier of the user, the test group information of each of the plurality of users corresponding to the group, of the plurality of groups, to which the user belongs.

2. The non-transitory computer-readable recording medium of claim 1, wherein the instructions, when executed by the one or more processors, cause the one or more processors to determine the test group information of each of the plurality of users by converting the unique identifier at least once by using a random function and distributing a conversion value to one of the plurality of groups included in the first test.

3. The non-transitory computer-readable recording medium of claim 1, wherein the instructions, when executed by the one or more processors, cause the one or more processors to determine by distributing, to one of the plurality of groups included in the first test, a unique identifier that is converted by adding a string to an arbitrary location of the unique identifier.

4. The non-transitory computer-readable recording medium of claim 1, wherein the instructions, when executed by the one or more processors, cause the one or more processors to determine the test group information of each of the plurality of users based on a remainder that is calculated by dividing the unique identifier by a total number of the plurality of groups included in the first test.

5. The non-transitory computer-readable recording medium of claim 1, wherein the instructions, when executed by the one or more processors, further cause the one or more processors to:
when it is determined that a distribution ratio of (i) a first number of users of a first group, of the plurality of groups of the first test, and (ii) a second number of users of a second group, of the plurality of groups of the first test, is a distribution ratio of one to two, set a number of the plurality of groups of the first test to be equal to three based on determining that the distribution ratio of the first number of users to the second number of users is a distribution ratio of one to two; and
distribute at least one user associated with test group information having a first value to the first group, and distributing at least one user of which associated with test group information having a second value or a third value to the second group.

6. The non-transitory computer-readable recording medium of claim 1, wherein the instructions, when executed by the one or more processors, further cause the one or more processors to:
generate an application providing different user interfaces according to the test group information of each user and distributing the application to each user terminal.

7. A server comprising:
a processor; and
a memory storing instructions executable by the processor,
wherein the processor executes the instructions to:
generate identification information of a first test to be performed, wherein the identification information of the first test is different from identification information of at least one test that is registered in advance, wherein the first test is performed by a plurality of user terminals, wherein each of the user terminals is associated with a respective user of a plurality of users, and wherein each of the plurality of users is classified into a plurality of groups;
generate a unique identifier of each of the plurality of users by using a first key for each of the plurality of users, the first key for each user comprising identification information of the user, and a second key comprising the identification information of the first test; and
determine test group information of each of the plurality of users based on the unique identifier of the user, the test group information of each of the plurality of users corresponding to the group, of the plurality of groups, into which the user is classified.

8. The server of claim 7, wherein the processor executes the instructions to determine the test group information of each of the plurality of users by converting the unique identifier at least once by using a random function and distributing a conversion value to one of the plurality of groups included in the first test.

9. The server of claim 7, wherein the processor executes the instructions to determine the test group information of each of the plurality of users by distributing, to one of the plurality of groups included in the first test, a unique identifier that is converted by adding a string to an arbitrary location of the unique identifier.

10. The server of claim 7, wherein the processor executes the instructions to determine the test group information of each of the plurality of users based on a remainder that is calculated by dividing the unique identifier by a total number of groups included in the first test.

11. The server of claim 7, wherein, when it is determined that a distribution ratio of (i) a first number of users of a first group, of the plurality of groups of the first test and (ii) a second number of users of a second group, of the plurality of groups of the first test, is a distribution ratio of one to two, the processor sets a number of the plurality of groups of the first test to be equal to three based on determining that the distribution ratio of the first number of users to the second number of users is a distribution ratio of one to two, and distributes at least one user associated with test group information having a first value to the first group, and distributes at least one user associated with test group information having a second value or a third value to the second group.

12. The server of claim 7, wherein the processor generates an application providing different user interfaces according to the test group information of each of the plurality of users and distributes the application to each user terminal.

* * * * *